US012640370B2

(12) United States Patent
Sugiyama et al.

(10) Patent No.: US 12,640,370 B2
(45) Date of Patent: May 26, 2026

(54) POSITIVE ELECTRODE MATERIAL AND BATTERY

(71) Applicants: Toyota Jidosha Kabushiki Kaisha, Toyota (JP); Panasonic Holdings Corporation, Kadoma (JP)

(72) Inventors: Toru Sugiyama, Nagakute (JP); Shinya Shiotani, Nagoya (JP); Takeshi Usami, Toukai (JP); Akinobu Miyazaki, Kadoma (JP); Izuru Sasaki, Kadoma (JP); Norihito Fujinoki, Kadoma (JP)

(73) Assignees: TOYOTA JIDOSHA KABUSHIKI KAISHA, Toyota (JP); PANASONIC HOLDINGS CORPORATION, Kadoma (JP)

( * ) Notice: Subject to any disclaimer, the term of this patent is extended or adjusted under 35 U.S.C. 154(b) by 349 days.

(21) Appl. No.: 18/014,684

(22) PCT Filed: Jul. 2, 2021

(86) PCT No.: PCT/JP2021/025191
§ 371 (c)(1),
(2) Date: Mar. 16, 2023

(87) PCT Pub. No.: WO2022/009806
PCT Pub. Date: Jan. 13, 2022

(65) Prior Publication Data
US 2023/0231124 A1     Jul. 20, 2023

(30) Foreign Application Priority Data
Jul. 8, 2020     (JP) ................................. 2020-117896

(51) Int. Cl.
H01M 4/62       (2006.01)
H01M 10/052     (2010.01)
(Continued)

(52) U.S. Cl.
CPC ........... H01M 4/62 (2013.01); H01M 10/052 (2013.01); H01M 10/0525 (2013.01);
(Continued)

(58) Field of Classification Search
CPC ...... H01M 4/131; H01M 4/525; H01M 5/505; H01M 4/62; H01M 2004/028;
(Continued)

(56) References Cited

U.S. PATENT DOCUMENTS

| 2014/0106223 A1* | 4/2014 | Xu ......................... H01M 4/131 |
| | | 429/223 |
| 2020/0350626 A1 | 11/2020 | Matsumura et al. |
| 2023/0002244 A1 | 1/2023 | Fujinoki |

FOREIGN PATENT DOCUMENTS

| CN | 104157831 | * 11/2014 |
| CN | 115336044 A | 11/2022 |

(Continued)

*Primary Examiner* — Laura Weiner
(74) *Attorney, Agent, or Firm* — Dinsmore & Shohl LLP

(57) ABSTRACT

Disclosed is a positive electrode material having inhibited increase in heat release when exposed to high temperature. The positive electrode material of the disclosure comprises a positive electrode active material, a first solid electrolyte and a second solid electrolyte, wherein the positive electrode active material comprises a lithium-containing oxide, the first solid electrolyte comprises Li and X as constituent elements and comprises no S, X is one or more elements selected from the group consisting of F, Cl, Br and I, the second solid electrolyte comprises Li and S as constituent elements, the first solid electrolyte covers at least part of the surface of the positive electrode active material, the second solid electrolyte contacts with the positive electrode active material across the first solid electrolyte, and the average covering thickness of the first solid electrolyte is 104 nm or greater.

3 Claims, 3 Drawing Sheets

10

(51) Int. Cl.
  *H01M 10/0525*     (2010.01)
  *H01M 10/0562*     (2010.01)
  *H01M 4/02*       (2006.01)
  *H01M 4/485*      (2010.01)
  *H01M 4/505*      (2010.01)
  *H01M 4/525*      (2010.01)
(52) U.S. Cl.
  CPC .. *H01M 10/0562* (2013.01); *H01M 2004/028*
        (2013.01); *H01M 4/485* (2013.01); *H01M*
        *4/505* (2013.01); *H01M 4/525* (2013.01);
      *H01M 2300/0068* (2013.01); *H01M 2300/008*
                          (2013.01)
(58) Field of Classification Search
  CPC ... H01M 2300/0068; H01M 2300/008; H01M
        10/0525; H01M 10/0562; H01M 4/624;
                          H01M 4/625
  See application file for complete search history.

(56)                References Cited

FOREIGN PATENT DOCUMENTS

| EP | 4131489 A1 | | 2/2023 |
|----|------------|---|--------|
| JP | 2019-537210 | * | 12/2019 |
| WO | WO 2012/077225 | * | 6/2012 |
| WO | 2019146236 A1 | | 8/2019 |

* cited by examiner

<u>10</u>

<u>1000</u>

Positive electrode active material layer ($\phi$10.0mm)

Solid electrolyte layer ($\phi$11.28mm)

Negative electrode active material layer ($\phi$11.28mm)

POSITIVE ELECTRODE MATERIAL AND BATTERY

CROSS-REFERENCE TO RELATED APPLICATION

This application is a national phase of International Application No. PCT/JP2021/025191 filed on Jul. 2, 2021, which claims priority to Japanese Patent Application No. 2020-117896 filed on Jul. 8, 2020, the entire contents of which are herein incorporated by reference.

FIELD

The present application discloses a positive electrode material and a battery.

BACKGROUND

PTL 1 discloses a positive electrode material that comprises a positive electrode active material, a covering layer that covers at least a part of the surface of the positive electrode active material and includes a first solid electrolyte, and a second solid electrolyte. When the surface of the positive electrode active material is covered with a first solid electrolyte as disclosed in PTL 1, it is possible to inhibit formation of a high resistance layer caused by direct contact between the positive electrode active material and second solid electrolyte.

CITATION LIST

Patent Literature

[PTL 1] International Patent Publication No. WO2019/146236

SUMMARY

Technical Problem

The positive electrode material disclosed in PTL 1 sometimes exhibits a higher heat generation when exposed to high temperature.

Solution to Problem

The present application discloses, as one means for solving the problem described above:
a positive electrode material comprising a positive electrode active material, a first solid electrolyte and a second solid electrolyte, wherein
the positive electrode active material comprises a lithium-containing oxide,
the first solid electrolyte comprises Li and X as constituent elements and comprises no S,
X is one or more elements selected from the group consisting of F, Cl, Br and I,
the second solid electrolyte comprises Li and S as constituent elements,
the first solid electrolyte covers at least part of the surface of the positive electrode active material,
the second solid electrolyte contacts with the positive electrode active material across the first solid electrolyte, and
the average covering thickness of the first solid electrolyte is 104 nm or greater.

In the positive electrode material of the present disclosure, the first solid electrolyte may comprise M as a constituent element, and
M may be one or more elements selected from the group consisting of metal elements other than Li, and metalloid elements.
In the positive electrode material of the present disclosure, the first solid electrolyte may have a chemical composition represented by $Li_\alpha M_\beta X_\gamma$,
where $\alpha$, $\beta$ and $\gamma$ may each independently represent a value greater than 0.
In the positive electrode material of the present disclosure, M may also include yttrium.
In the positive electrode material of the present disclosure, X may be at least one of Cl and Br.
In the positive electrode material of the present disclosure, the second solid electrolyte may also comprise Li, P and S as constituent elements.
The present application also discloses, as means for solving the problem described above, a battery comprising:
a positive electrode active material layer,
a solid electrolyte layer, and
a negative electrode active material layer,
wherein the positive electrode active material layer is composed of the positive electrode material of the present disclosure.

Advantageous Effects

The positive electrode material of the disclosure has inhibited increase of heat generation when exposed to high temperature.

DETAILED DESCRIPTION

Figure 1:
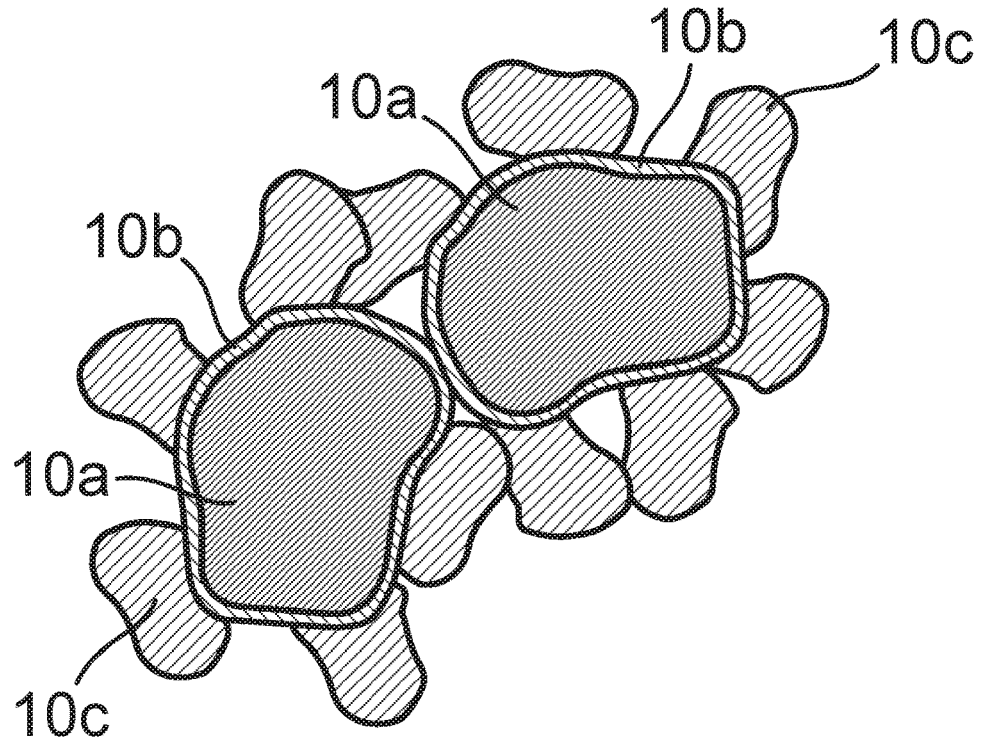
FIG. 1 is a schematic view of an example of the structure of a positive electrode material.

1. Positive Electrode Material
As shown in FIG. 1 the positive electrode material 10 comprises a positive electrode active material 10a, a first solid electrolyte 10b and a second solid electrolyte 10c. The positive electrode active material 10a comprises a lithium-containing oxide. The first solid electrolyte 10b comprises Li and X as constituent elements, but comprises no S. Here, X is one or more elements selected from the group consisting of F, Cl, Br and I. The second solid electrolyte 10c comprises Li and S as constituent elements. The first solid electrolyte 10b covers at least part of the surface of the positive electrode active material 10a. The second solid electrolyte 10c contacts with the positive electrode active material 10a across the first solid electrolyte 10b. The average covering thickness of the first solid electrolyte 10b is 104 nm or greater.

1.1 Positive Electrode Active Material

The positive electrode active material 10a comprises a lithium-containing oxide. A lithium-containing oxide is an oxide that includes lithium as a constituent element, but it may also comprise other elements in addition to lithium and oxygen. It is sufficient for the lithium-containing oxide to be one that functions as a positive electrode active material for a battery. Specific examples of lithium-containing oxides include lithium cobaltate, lithium nickelate, lithium manganate and Li(Ni, Co, Mn)$O_{2\pm\delta}$ (such as $LiNi_{1/3}Co_{1/3}Mn_{1/3}O_{2\pm\delta}$). The lithium-containing oxide may have, for example, a layered rock salt type crystal phase or a spinel-type crystal phase or another type of crystal phase. The lithium-containing oxide may be one that releases oxygen at any temperature within the range of 80° C. to 260° C., for example. The positive electrode active material 10a may also comprise a positive electrode active material other than a lithium-containing oxide, in addition to the lithium-containing oxide.

The surface of the positive electrode active material 10a may also be constructed with a protective layer containing a Li ion conductive oxide. That is, the positive electrode active material 10a used may be a complex comprising the lithium-containing oxide and a protective layer formed on its surface. This will help to further prevent reaction between the positive electrode active material and sulfide solid electrolytes. Examples of Li ion conductive oxides include $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $LiNbO_3$, $Li_2MoO_4$ and $Li_2WO_4$. The coverage (area ratio) of the protective layer may be 70% or greater, 80% or greater or 90% or greater, for example. The thickness of the protective layer may be 0.1 nm or greater, or 1 nm or greater, for example. The thickness of the protective layer may also be 100 nm or smaller or 20 nm or smaller, for example.

The form of the positive electrode active material 10a is not particularly limited. The positive electrode active material 10a may be particulate or laminar, for example. The positive electrode active material 10a may be in the form of primary particles, or secondary particles which are aggregates of primary particles. When the positive electrode active material 10a is small (the positive electrode active material 10a has a large area-to-weight ratio), the total area to be covered by the first solid electrolyte 10b will increase, thereby increasing the volume of the first solid electrolyte 10b in the positive electrode material 10. The positive electrode active material 10a may therefore be increased in size from the standpoint of processing cost, material cost and energy density. However, a larger positive electrode active material 10a results in slower ion diffusion, often increasing the initial internal resistance when used in a battery. A smaller positive electrode active material 10a may therefore be used. When the positive electrode active material 10a is in particulate form, the mean particle diameter ($D_{50}$) may be 0.1 μm or greater, 0.5 μm or greater or 1 μm or greater, and 100 μm or smaller, 50 μm or smaller or 20 μm or smaller, for example. When the positive electrode active material 10a is in particulate form, the BET specific surface area may be 0.1 $m^2$/g or greater or 0.2 $m^2$/g or greater, and 5.0 $m^2$/g or lower or 2.0 $m^2$/g or lower, for example. The mean particle diameter ($D_{50}$) is the median diameter (50% volume-average particle diameter) derived from the particle size distribution measured with a particle size distribution analyzer based on laser scattering/diffraction.

The content of the positive electrode active material 10a in the positive electrode material 10 is not particularly limited and may be set as appropriate for the desired performance. For example, the content of the positive electrode active material 10a may be 30 mass % or greater, 40 mass % or greater, or 50 mass % or greater, and 95 mass % or lower, 90 mass % or lower or 85 mass % or lower, with the total positive electrode material 10 (the total solid content) as 100 mass %.

1.2 First Solid Electrolyte

The first solid electrolyte 10b covers at least part of the surface of the positive electrode active material 10a. The positive electrode active material 10a may have a portion that is not covered by the first solid electrolyte 10b. The first solid electrolyte 10b may cover 50% or more, 70% or more or 90% or more of the surface of the positive electrode active material 10a. The first solid electrolyte 10b may also cover the entirety (100%) of the surface of the positive electrode active material 10a, as shown in FIG. 1.

The first solid electrolyte 10b comprises Li and X as constituent elements. X is one or more elements selected from the group consisting of F, Cl, Br and I. The first solid electrolyte 10b may be an inorganic halide solid electrolyte. The Li content or X content of the first solid electrolyte 10b is not particularly limited and may be appropriately determined depending on the desired ion conductivity. The first solid electrolyte 10b also comprises no S as a constituent element. The phrase "comprises no S" means that it essentially comprises no S. The first solid electrolyte 10b may still include S as an impurity. For example, the first solid electrolyte 10b is considered to comprise no S if the percentage of S in the total elements composing the first solid electrolyte 10b is no greater than 0.1 mol %. This also applies to elements other than S.

It is assumed that the problem described above can be solved even when the first solid electrolyte 10b does not include elements other than lithium and X. However, the first solid electrolyte 10b may also comprise M as a constituent element from the viewpoint of further increasing the ion conductivity of the first solid electrolyte 10b. M represents one or more elements selected from the group consisting of metal elements other than Li, and metalloid elements. The phrase "metal elements other than Li" are all elements in Groups 1 to 12 of the Periodic Table excluding H and Li, as well as all elements in Groups 13 to 16 of the Periodic Table excluding B, Si, Ge, Al, Sb, Te, C, N, P, O, S and Se. The term "metalloid elements" refers to B, Si, Ge, As, Sb and Te. These metal elements and metalloid elements can act as cations when forming halides. The M content of the first solid electrolyte 10b is not particularly limited and may be appropriately determined depending on the desired ion conductivity.

The first solid electrolyte 10b may have a chemical composition represented by $Li_\alpha M_\beta X_\gamma$, where α, β and γ may each independently represent a value greater than 0. The first solid electrolyte 10b having such a chemical composition has even higher ion conductivity. The specific values for α, β and γ are not particularly limited. From the viewpoint of ensuring even higher ion conductivity for the first solid electrolyte 10b, α may be 2.5 or greater or 2.8 or greater, and 3.5 or smaller, 3.3 or smaller or 3.0 or smaller. Also, β may be 0.5 or greater, 0.8 or greater or 1.0 or greater, and 1.5 or smaller, 1.3 or smaller or 1.1 or smaller. It is sufficient to set γ according to α, β and the valency of M.

When the first solid electrolyte 10b has an M element, M may include yttrium, or M may consist entirely of yttrium. This will further increase the ion conductivity of the first solid electrolyte 10b.

In the first solid electrolyte 10b, X may be at least one of Cl and Br. That is, the first solid electrolyte 10b may not include F, may not include I, or may not include F and I, as constituent elements. With X in the first solid electrolyte 10$b$ as either or both Cl and Br, it is possible to improve the oxidation stability of the first solid electrolyte 10$b$.

The first solid electrolyte 10$b$ may have a chemical composition represented by Li$_a$Me$_b$Y$_c$X$_d$, for example. Me is one or more elements selected from the group consisting of metal elements other than Li and Y, and metalloid elements, where a>0, b≥0, c>0, m is the valency of Me, and d is determined according to a, b, c and m. The letters a, b, c and m may satisfy the equation: a+mb+3c=6. Me may be one or more elements selected from the group consisting of Mg. Ca, Sr. Ba, Zn, Sc, Al, Ga, Bi, Zr, Hf, Ti, Sn, Ta and Nb. The ion conductivity is also higher when the first solid electrolyte 10$b$ has this type of chemical composition.

The first solid electrolyte 10$b$ may also have a chemical composition represented by Li$_{6-3e}$Y$_e$X$_f$, for example. In this formula, 0<e<2, and f is determined according to e. The ion conductivity is also higher when the first solid electrolyte 10$b$ has this type of chemical composition.

The first solid electrolyte 10$b$ may also have a chemical composition represented by Li$_3$YX$_6$, for example. The ion conductivity is also higher when the first solid electrolyte 10$b$ has this type of chemical composition.

The first solid electrolyte 10$b$ may be either crystalline or amorphous. This property may be selected as appropriate depending on the desired ion conductivity. The first solid electrolyte 10$b$ used may be of a single type alone or a combination of two or more types.

The average covering thickness of the first solid electrolyte 10$b$ with respect to the positive electrode active material 10$a$ is 104 nm or greater. Based on knowledge of the present inventors, the positive electrode active material 10$a$ releases oxygen when exposed to high temperature. If the oxygen released from the positive electrode active material 10$a$ reaches the second solid electrolyte 10$c$, the oxygen and the second solid electrolyte 10$c$ produce an exothermic reaction. In the positive electrode material 10 of the disclosure, a first solid electrolyte 10$b$ is provided with an average covering thickness of 104 nm or greater on the surface of the positive electrode active material 10$a$, and therefore oxygen that is released from the positive electrode active material 10$a$ is impeded from reaching the second solid electrolyte 10$c$, allowing exothermic reaction to be inhibited. That is, the positive electrode material 10 of the disclosure can inhibit increase in heat generation when exposed to high temperature. The average covering thickness of the first solid electrolyte 10$b$ may be 110 nm or greater, 115 nm or greater, 120 nm or greater, 125 nm or greater, 130 nm or greater or 135 nm or greater. There is no particular restriction on the upper limit of the average covering thickness of the first solid electrolyte 10$b$, and it may be appropriately set in consideration of ion conductivity. For example, the average covering thickness of the first solid electrolyte 10$b$ may be 300 nm or lower, 250 nm or lower or 200 nm or lower. The minimum value for the first solid electrolyte 10$b$ covering thickness may also be less than 104 nm, or the minimum value may be greater than 104 nm. When the first solid electrolyte 10$b$ covers the entire surface of the positive electrode active material 10$a$, the entire surface may have a covering thickness of 104 nm or greater.

The "average covering thickness of the first solid electrolyte 10$b$" can be determined in the following manner. First, the positive electrode material 10 is observed with a scanning electron microscope or transmission electron microscope, and a cross-sectional two-dimensional image of the positive electrode material 10 is obtained. One positive electrode active material 10$a$ and the first solid electrolyte 10$b$ covering that positive electrode active material 10$a$ are extracted from the two-dimensional image by element mapping. In the two-dimensional image, it can be judged that the region where oxygen is present corresponds to the positive electrode active material 10$a$, while the region where the halogen is present and no sulfur is present corresponds to the first solid electrolyte 10$b$ and the region where sulfur is present corresponds to the second solid electrolyte 10$c$. The area A1 of the extracted positive electrode active material 10$a$ and the area A2 of the first solid electrolyte 10$b$ covering the periphery of the positive electrode active material 10$a$ are determined. The radius R1 of a circle corresponding to the area A1 is also determined. The radius R2 of a circle corresponding to the area A1+A2 is determined as well. The value of R2 minus R1 (R2–R1) can be used as the average covering thickness of the first solid electrolyte 10$b$. When the positive electrode active material 10$a$ has a hollow structure, the area A1 of the positive electrode active material 10$a$ as extracted and determined by element mapping may have a reduced count. For example, when element mapping has been carried out for a positive electrode active material 10$a$ with a hollow structure, in some cases the hollow structure portion will be the "spaces surrounded by active material component" (the regions where the active material component is not extracted). Therefore when the area A1 of the positive electrode active material 10$a$ is determined by element mapping for a positive electrode active material 10$a$ having a hollow structure, even the sections of the "spaces surrounded by active material component" are considered to be sections where active material is present, and are included in the area A1 of the positive electrode active material 10$a$.

The first solid electrolyte 10$b$ covers at least part of the surface of the positive electrode active material 10$a$ in a continuous manner along the shape of the surface of the positive electrode active material 10$a$. This includes forms where the film-like first solid electrolyte 10$b$ covers the surface of the positive electrode active material 10$a$, or where particles of the first solid electrolyte 10$b$ are adhering to or accumulated along the shape of the surface of the positive electrode active material 10$a$, for example. The positive electrode material 10 of the present disclosure differs from a mutual mixture or dispersion of the positive electrode active material 10$a$, first solid electrolyte 10$b$ and second solid electrolyte 10$c$.

There are no particular restrictions on the method of covering the surface of the positive electrode active material 10$a$ with the first solid electrolyte 10$b$. For example, it may be a method of mixing the positive electrode active material 10$a$ and first solid electrolyte 10$b$ to adhere particles of the first solid electrolyte 10$b$ onto the surface of the positive electrode active material 10$a$. A conductive aid may also be added during mixture of the positive electrode active material 10$a$ and first solid electrolyte 10$b$. Specifically, a covering layer of the first solid electrolyte 10$b$ may be formed on the surface of the positive electrode active material 10$a$, or a covering layer may be formed by the first solid electrolyte 10$b$ together with a conductive aid. Based on the knowledge of the present inventors, when a second solid electrolyte 10$c$ is mixed with the positive electrode active material 10$a$ and first solid electrolyte 10$b$ before the surface of the positive electrode active material 10$a$ is covered by the first solid electrolyte 10$b$, not only is it difficult to cover the surface of the positive electrode active material 10$a$ with the first solid electrolyte 10$b$, but the overall resistance of the positive electrode material is also notably increased.

1.3 Second Solid Electrolyte

The second solid electrolyte 10c contacts with the positive electrode active material 10a across the first solid electrolyte 10b. That is, the first solid electrolyte 10b lies between the positive electrode active material 10a and the second solid electrolyte 10c. If the second solid electrolyte 10c is connected with the positive electrode active material 10a across the first solid electrolyte 10b, ion conduction paths form between the positive electrode active material 10a, first solid electrolyte 10b and second solid electrolyte 10c, allowing the ion conductivity of the positive electrode material 10 as a whole to be improved.

The second solid electrolyte 10c comprises Li and S as constituent elements. The second solid electrolyte 10c may be an inorganic sulfide solid electrolyte. Examples of such compounds for the second solid electrolyte 10c include $Li_2S$—$P_2S_5$, $Li_2S$—$SiS_2$, $LiI$—$Li_2S$—$SiS_2$, $LiI$—$Si_2S$—$P_2S_5$, $Li_2S$—$P_2S_5$—$LiI$—$LiBr$, $LiI$—$Li_2S$—$P_2S_5$, $LiI$—$Li_2S$—$P_2O_5$, $LiI$—$Li_3PO_4$—$P_2S_5$ and $Li_2S$—$P_2S_5$—$GeS_2$. From the viewpoint of ensuring high ion conductivity, the second solid electrolyte 10c may comprise Li, P and S as constituent elements, and it may comprise $Li_2S$—$P_2S_5$. In a second solid electrolyte 10c that comprises $Li_2S$—$P_2S_5$, the content ratio of the $Li_2S$ and $P_2S_5$ is not particularly limited.

The second solid electrolyte 10c may be either crystalline or amorphous. This property may be selected as appropriate depending on the desired ion conductivity. The second solid electrolyte 10c used may be of a single type alone or a mixture of two or more types.

The form of the second solid electrolyte 10c is not particularly limited. For example, it may be in a particulate, needle-like, laminar or amorphous form. When the second solid electrolyte 10c is in particulate form, the mean particle diameter ($D_{50}$) may be 0.1 μm or greater or 1 μm or greater, and 100 μm or smaller or 10 μm or smaller. The second solid electrolyte 10c may also be present in either a bigger form or smaller form than the positive electrode active material 10a.

The content of the second solid electrolyte 10c in the positive electrode material 10 is not particularly limited and may be set as appropriate for the desired performance. For example, the content of the second solid electrolyte 10c may be 5 mass % or greater or 10 mass % or greater, and 65 mass % or lower or 45 mass % or lower, with the total positive electrode material 10 (the total solid content) as 100 mass %.

1.4 Other Components

Figure 2:
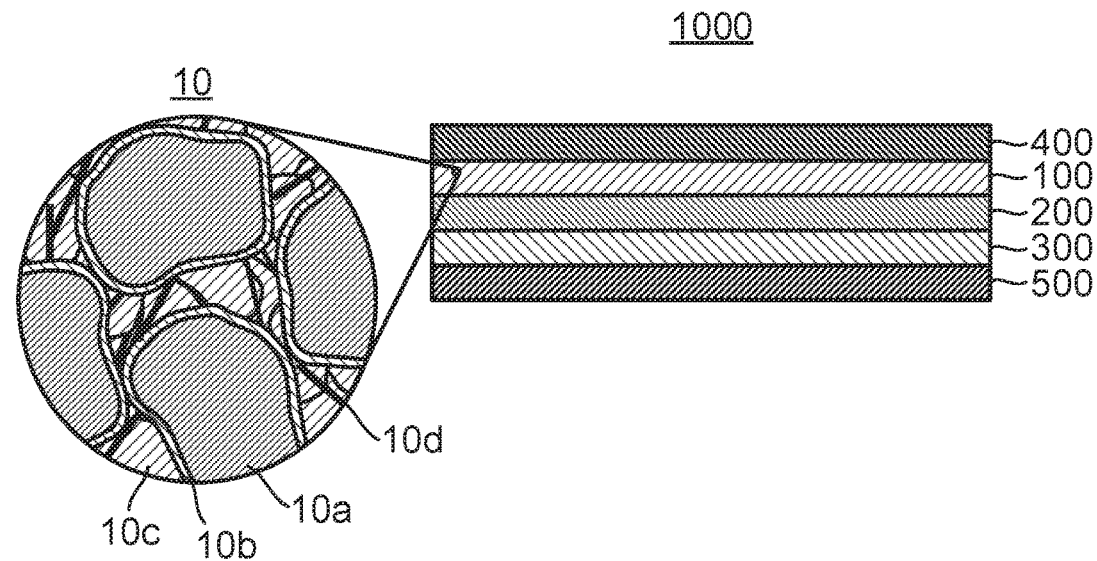
FIG. 2 is a schematic view of an example of the structure of a battery.

The positive electrode material 10 may also include a conductive aid 10d (see FIG. 2). The conductive aid 10d may form the covering layer on the surface of the positive electrode active material 10a together with the first solid electrolyte 10b, as mentioned above, or it may be disposed outside of the covering layer. The conductive aid 10d used may be any known conductive aid commonly employed in battery positive electrodes. Examples include carbon materials such as acetylene black (AB), furnace black, channel black, thermal black or Ketchen black (KB), vapor-grown carbon fibers (VGCF), carbon nanotubes (CNT), carbon nanofibers (CNF) or graphite; and metal materials such as nickel, aluminum or stainless steel. The conductive aid 10d used may be of a single type alone or a mixture of two or more types. The form of the conductive aid 10d may be any of various forms such as powdered or fiber forms. The content of the conductive aid 10d in the positive electrode material 10 is not particularly limited and may be set as appropriate for the desired performance. For example, the content of the conductive aid 10d may be 0.5 mass % or greater or 1 mass % or greater, and 20 mass % or lower or 10 mass % or lower, with the total positive electrode material 10 (the total solid content) as 100 mass %.

The positive electrode material 10 may also include a binder. The binder used may be any known binder commonly employed in battery positive electrodes. For example, at least one selected from among styrene-butadiene rubber (SBR)-based binders, carboxymethyl cellulose (CMC)-based binders, acrylonitrile-butadiene rubber (ABR)-based binders, butadiene rubber (BR)-based binders, polyvinylidene fluoride (PVDF)-based binders and polytetrafluoroethylene (PTFE)-based binders may be used. The content of the binder in the positive electrode material 10 is not particularly limited and may be set as appropriate for the desired performance. For example, the content of the binder may be 1 mass % or greater or 2 mass % or greater, and 30 mass % or lower or 15 mass % or lower, with the total positive electrode material 10 (the total solid content) as 100 mass %.

The positive electrode material 10 may also comprise a positive electrode active material other than the positive electrode active material 10a. The positive electrode active material other than the positive electrode active material 10a may have at least a portion of its surface covered with the first solid electrolyte 10b, or it may be uncovered.

The positive electrode material 10 may also comprise a solid electrolyte other than the first solid electrolyte 10b and second solid electrolyte 10c. For example, it may comprise an oxide solid electrolyte such as lithium lanthanum zirconate, LiPON, $Li_{1+x}Al_xGe_{2-x}(PO_4)_3$, Li—SiO-based glass or Li—Al—S—O-based glass.

1.5 Overall Form

The positive electrode material 10 may be generally a powder, or it may be molded into a form suitable for the intended use. The positive electrode material 10 may also comprise a plurality of particulate positive electrode active materials 10a. As explained below, the positive electrode material 10 may be used as a positive electrode active material layer 100. The positive electrode material 10 may also be added to a solvent to form a paste or slurry.

2. Battery

As shown in FIG. 2, the battery 1000 comprises a positive electrode active material layer 100, a solid electrolyte layer 200 and a negative electrode active material layer 300. The positive electrode active material layer 100 is composed of the aforementioned positive electrode material 10.

2.1 Positive Electrode Active Material Layer

The positive electrode active material layer 100 is made of the aforementioned positive electrode material 10. The thickness of the positive electrode active material layer 100 may be 0.1 μm or greater, 1 μm or greater or 10 μm or greater, and 1 mm or smaller, 500 μm or smaller or 100 μm or smaller, for example.

The positive electrode active material layer 100 can be easily produced by first adding the positive electrode material 10 to a solvent and kneading to obtain a positive electrode paste or slurry, and then coating and drying it onto the surface of the positive electrode collector 400 and/or the surface of the solid electrolyte layer 200. There is no limitation to such a wet method, however, and the positive electrode active material layer 100 can also be produced by dry compaction.

2.2 Solid Electrolyte Layer

The solid electrolyte layer 200 comprises a solid electrolyte and optionally a binder. The solid electrolyte of the solid electrolyte layer 200 may be any one of those mentioned above as examples for the second solid electrolyte 10c. The solid electrolyte of the solid electrolyte layer 200 may be the same as or different from the second solid electrolyte 10c mentioned above. Depending on the purpose, multiple types of solid electrolytes may also be used in combination. The binder used may be appropriately selected from among the binders mentioned above. The content of each component in the solid electrolyte layer 200 may be the same as for solid electrolyte layers in a conventional battery. The shape of the solid electrolyte layer 200 may also be the same as in the prior art. A sheet-like solid electrolyte layer 200 may be used in some embodiments. For a sheet, the thickness of the solid electrolyte layer 200 may be 0.1 μm or greater, and 300 μm or smaller or 100 μm or smaller, for example.

The solid electrolyte layer 200 can be easily produced, for example, by first adding the solid electrolyte and optionally a binder to a solvent and kneading to obtain a solid electrolyte paste or slurry, and then coating and drying it onto the surface of a base material, or coating and drying it onto the surface of the positive electrode active material layer 100 and/or negative electrode active material layer 300. Alternatively, it can likewise be easily produced by dry compaction of the solid electrolyte and optionally a binder.

2.3 Negative Electrode Active Material Layer

The negative electrode active material layer 300 is a layer that includes at least a negative electrode active material, and it may also optionally include, in addition to the negative electrode active material, a solid electrolyte, binder and conductive aid. The negative electrode active material used may be any publicly known active material. A negative electrode active material may be selected from among known active materials which have a potential for occlusion and release of the specified ion (charge-discharge potential) that is a more electronegative potential than the positive electrode active material 10a. For example, a Si-based active material such as Si or a Si alloy; a carbon-based active material such as graphite or hard carbon; an oxide-based active material such as lithium titanate; or lithium metal or a lithium alloy, may be used as the negative electrode active material. The solid electrolyte, binder and conductive aid used may be appropriately selected from among those mentioned as examples for use in the positive electrode material 10. The content of each component in the negative electrode active material layer 300 may be the same as in the prior art. The shape of the negative electrode active material layer 300 may also be the same as in the prior art. A sheet-like negative electrode active material layer 300 may be used in some embodiments to facilitate construction of the battery 1000. For a sheet, the thickness of the negative electrode active material layer 300 may be 0.1 μm or greater, 1 μm or greater or 10 μm or greater, and 1 mm or smaller, 500 μm or smaller or 100 μm or smaller, for example. The thickness of the negative electrode active material layer 300 may also be set so that the capacity of the negative electrode active material layer 300 is higher than the capacity of the positive electrode active material layer 100.

The negative electrode active material layer 300 can be easily produced, for example, by first adding the negative electrode active material and optionally a solid electrolyte, binder and conductive aid to a solvent and kneading to obtain a negative electrode paste or slurry, and then coating and drying it onto the surface of a negative electrode collector 500 and/or the surface of the solid electrolyte layer 200. There is no limitation to such a wet method, however, and the negative electrode active material layer 300 can also be produced by dry compaction.

2.4 Positive Electrode Collector

The positive electrode collector 400 may be composed of a metal foil or metal mesh, for example. A metal composing the positive electrode collector 400 may be Ni, Cr, Au, Pt, Al, Fe, Ti, Zn or stainless steel. The positive electrode collector 400 may also have a surface coating layer. The thickness of the positive electrode collector 400 is not particularly restricted. For example, it may be 0.1 μm or greater or 1 μm or greater, or 1 mm or smaller or 100 μm or smaller.

2.5 Negative Electrode Collector

The negative electrode collector 500 may be composed of a metal foil or metal mesh, for example. A metal composing the negative electrode collector 500 may be Cu, Ni, Fe, Ti, Co, Zn or stainless steel. The negative electrode collector 500 may also have a surface coating layer. The thickness of the negative electrode collector 500 is not particularly restricted. For example, it may be 0.1 μm or greater or 1 μm or greater, or 1 mm or smaller or 100 μm or smaller.

2.6 Other Components

The battery 1000 may also comprise terminals and a battery case, for example, as necessary in addition to the positive electrode active material layer 100, solid electrolyte layer 200, negative electrode active material layer 300, positive electrode collector 400 and negative electrode collector 500. The shape of the battery 1000 is not particularly limited and may be a coin, cylindrical, rectilinear, sheet-like, button-like, flat or stacked form. The battery 1000 may also be an all-solid-state battery.

3. Method for Producing Positive Electrode Material

The positive electrode material of the present disclosure can be produced by the following method, for example. Specifically, the production method of the present disclosure comprises:

covering at least part of the surface of the positive electrode active material 10a with the first solid electrolyte 10b, and mixing the positive electrode active material 10a covered by the first solid electrolyte 10b with the second solid electrolyte 10c, causing the second solid electrolyte 10c to contact with the positive electrode active material 10a across the first solid electrolyte 10b, wherein:

the positive electrode active material 10a comprises a lithium-containing oxide, the first solid electrolyte 10b comprises Li and X as constituent elements and comprises no S, X is one or more elements selected from the group consisting of F, Cl, Br and I, the second solid electrolyte 10c comprises Li and S as constituent elements, and the average covering thickness of the first solid electrolyte 10b is 104 nm or greater.

By thus first covering the positive electrode active material 10a with the first solid electrolyte 10b and then mixing with the second solid electrolyte 10c, it is possible to easily produce a positive electrode material 10 with reduced resistance and inhibited heat generation increase at high temperature.

4. Supplement

When a covering layer composed of a first solid electrolyte is provided on the surface of a positive electrode active material, it is common knowledge in the prior art to reduce the thickness of the covering layer in order to lower internal resistance as disclosed in PTL 1. In PTL 1, for example, the thickness of the covering layer composed of a first solid electrolyte is specified as being 100 nm or smaller. Based on the knowledge of the present inventors, however, when the surface of a positive electrode active material is covered with a first solid electrolyte and a second solid electrolyte is connected with the positive electrode active material across the first solid electrolyte, sufficient lithium ion conduction paths are formed between the positive electrode active material, first solid electrolyte and second solid electrolyte, so that the resistance is not significantly increased even if the average covering thickness of the first solid electrolyte is as thick as 104 nm or greater. The positive electrode material of the present disclosure can thus inhibit increase in resistance due to the first solid electrolyte while reducing exothermic reaction between the second solid electrolyte and oxygen released from the positive electrode active material at high temperature.

EXAMPLES

1. Evaluation of Heat Generation

1.1 Example 1

1.1.1 Fabrication of Positive Electrode Active Material with Protective Layer

After weighing out 20.8 g of ethoxylithium (Kojundo Chemical Lab. Co., Ltd.) and 127.3 g of pentaethoxyniobium (Kojundo Chemical Lab. Co., Ltd.) (1:1 molar ratio), they were dissolved in 2 L of ultrapure water-ethanol (Wako Pure Chemical Industries, Ltd.) to prepare a solution containing the materials for formation of a protective layer. A tumbling fluid bed granulator/coater (MP-01 by Powrex Corp.) was then used for spraying of the solution onto 1 kg of $Li(Ni, Co, Mn)O_2$ (product of Sigma-Aldrich, mean particle diameter D50: 4.6 μm) as the positive electrode active material, adhering the solution onto the surfaces of the positive electrode active material particles. The operating conditions for the coater were nitrogen as the intake gas, an intake temperature of 120° C., an intake airflow rate of 0.4 $m^3$/min. a rotor rotation rate of 400 rpm and a spray speed of 4.8 g/min. The obtained powder was fired for 5 hours in air at 200° C., and then re-ground with an agate mortar to obtain a positive electrode active material having a protective layer. The composition of the protective layer was $LiNbO_3$.

1.1.2 Fabrication of First Solid Electrolyte

After weighing out $YCl_3$ (Sigma-Aldrich), LiCl (Kojundo Chemical Laboratory Co., Ltd.) and LiBr (Kojundo Chemical Laboratory Co., Ltd.) in the predetermined composition, they were loaded into a 45 ml $ZrO_2$ pot, together with φ5 mm $ZrO_2$ balls. The mixture was milled for 40 hours at 500 rpm to obtain $Li_3YCl_4Br_2$ powder as a first solid electrolyte.

1.1.3 Covering of Positive Electrode Active Material

The positive electrode active material, the first solid electrolyte and carbon black (Tokai Carbon) at 0.5 wt % of the active material as a conductive aid, were mixed with an agate mortar to cover the surface of the positive electrode active material with the first solid electrolyte. When the first solid electrolyte-covered positive electrode active material was observed by SEM, it was found that the entire surfaces of the positive electrode active material particles were covered with the first solid electrolyte. The average covering thickness of the first solid electrolyte on the positive electrode active material surface was 104 nm.

1.1.4 Fabrication of Second Solid Electrolyte

After weighing out $Li_2S$ (Mitsuwa Chemicals Co., Ltd.) and $P_2S_5$ (Sigma-Aldrich) to a molar ratio of $Li_2S:P_2S_5=75:$ 25, they were loaded into a 45 ml $ZrO_2$ pot together with φ8 mm $ZrO_2$ balls. The mixture was milled for 20 hours at 500 rpm to obtain a precursor powder. The obtained precursor powder was pelletized, placed in a quartz tube and vacuumsealed, and then fired for 3 hours. The fired pellets were ground with a mortar to obtain $0.75Li_2S-0.25P_2S_5$ powder as a second solid electrolyte.

1.1.5 Fabrication of Positive Electrode Material

The positive electrode active material covered by the first solid electrolyte, VGCF (Showa Denko K.K.) at 1.5 wt % of the active material, and the second solid electrolyte, were mixed with an agate mortar to produce a positive electrode material.

1.1.6 Fabrication of Negative Electrode Material

Si (Kojundo Chemical Laboratory Co., Ltd.), VGCF and the second solid electrolyte were mixed with an agate mortar to fabricate a negative electrode material.

1.1.7 Fabrication of Battery

Figure 3:
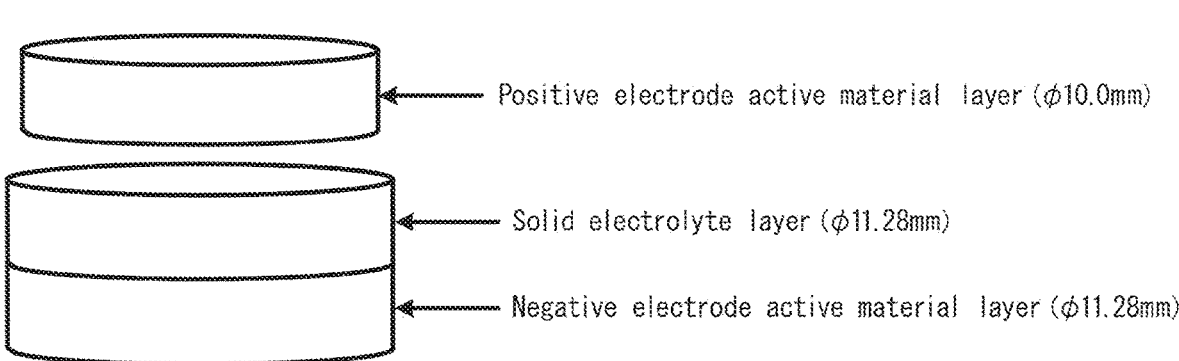
FIG. 3 is a schematic view of the structures of the batteries of the Examples and Comparative Examples.

The construction of the battery used for evaluation is shown schematically in FIG. 3. First, the second solid electrolyte was compacted in a φ11.28 mm cylinder at a pressure of 1 ton/cm² to produce a solid electrolyte layer. After then accumulating the negative electrode material on the solid electrolyte layer, they were compacted at a pressure of 4 ton/cm² to produce a bonded structure comprising the solid electrolyte layer and a negative electrode active material layer. The positive electrode material was then compacted in a φ10.0 mm cylinder at a pressure of 1 ton/cm² to produce a positive electrode active material layer (positive electrode pellets). The positive electrode pellets were placed on the surface of the solid electrolyte layer, on the opposite side from the negative electrode active material layer, and constrained to form an evaluation battery.

1.1.8 Heat Generation Measurement

The evaluation battery was subjected to constant-current/ constant-voltage charging at 0.1 C, charging to 4.35 V. After full charging, the battery constraint was removed and the positive electrode pellets were removed. The removed positive electrode pellets were ground with an agate mortar to prepare a sample, and differential scanning calorimetry analysis (DSC) carried out to confirm the heat generation from room temperature to 260° C. under an Ar atmosphere. The integrated value for heat generation in the range from 80° C. to 260° C. was calculated and recorded as the "heat generation at high temperature (J/g)" for the positive electrode material.

1.2 Example 2

A positive electrode material and battery were fabricated in the same manner as Example 1, except for changing the mixing ratio and mixing time for the positive electrode active material and first solid electrolyte, and changing the thickness of the first solid electrolyte covering the positive electrode active material, and the heat release was evaluated. When the first solid electrolyte-covered positive electrode active material was observed by SEM, it was found that the entire surfaces of the positive electrode active material particles were covered with the first solid electrolyte. The average covering thickness of the first solid electrolyte was 140 nm.

1.3 Example 3

A positive electrode material and battery were fabricated in the same manner as Example 1, except for changing the mixing ratio and mixing time for the positive electrode active material and first solid electrolyte, and changing the thickness of the first solid electrolyte covering the positive electrode active material, and the heat release was evaluated. When the first solid electrolyte-covered positive electrode active material was observed by SEM, it was found that the entire surfaces of the positive electrode active material particles were covered with the first solid electrolyte. The average covering thickness of the first solid electrolyte was 176 nm.

1.4 Comparative Example 1

A positive electrode active material not covered by the first solid electrolyte, VGCF (Showa Denko K.K.) at 1.5 wt % of the active material, and the second solid electrolyte, were mixed with an agate mortar to produce a positive electrode material. The mixing ratio of the active material, VGCF and second solid electrolyte were the same as in Example 1. A battery was fabricated in the same manner as Example 1 using this positive electrode material, and the heat release was evaluated.

1.5 Comparative Example 2

A positive electrode material and battery were fabricated in the same manner as Example 1, except for changing the mixing ratio and mixing time for the positive electrode active material and first solid electrolyte, and changing the thickness of the first solid electrolyte covering the positive electrode active material, and the heat release was evaluated. When the first solid electrolyte-covered positive electrode active material was observed by SEM, it was found that the entire surfaces of the positive electrode active material particles were covered with the first solid electrolyte. The average covering thickness of the first solid electrolyte was 67 nm.

1.6. Evaluation Results

Figure 4:
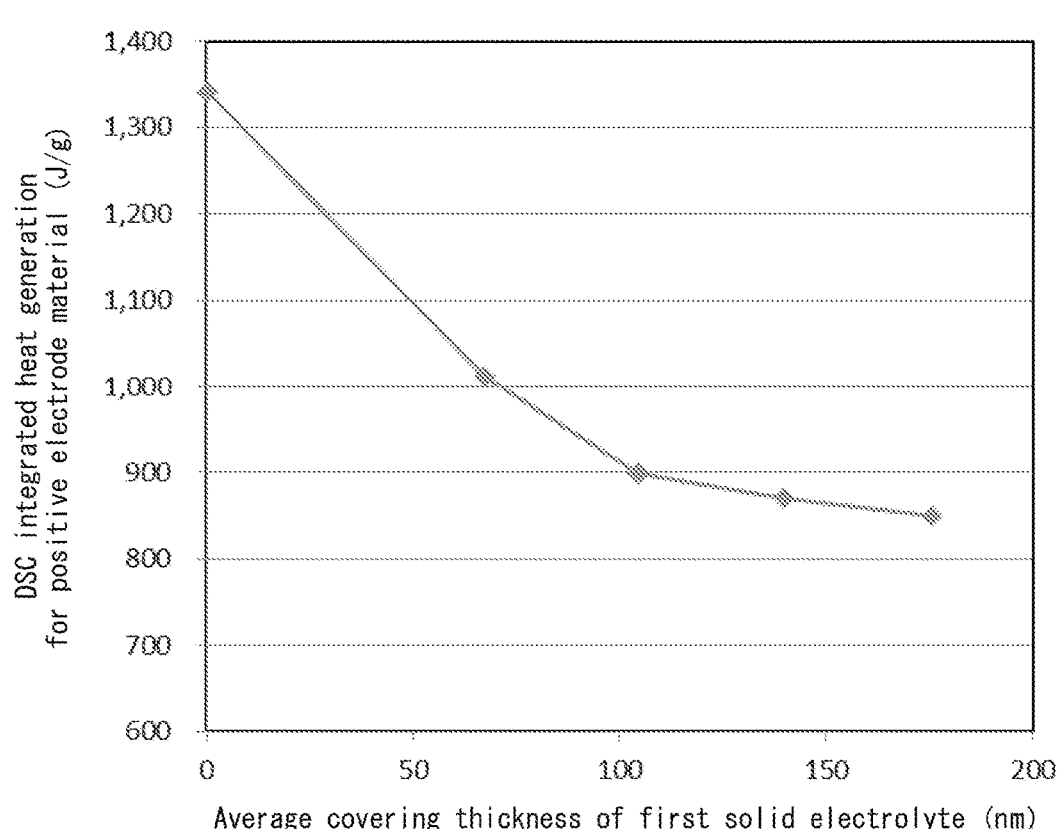
FIG. 4 shows the relationship between average thickness of the covering layer and heat generation of the positive electrode material.

The evaluation results for heat release are shown in Table 1 and FIG. 4.

TABLE 1

|  | First solid electrolyte composition | Covering layer thickness (nm) | Second solid electrolyte composition | Heat generation at high temperature (J/g) |
|---|---|---|---|---|
| Comp. Example 1 | Li$_3$YCl$_4$Br$_2$ | 0 | 0.75Li$_2$S-0.25P$_2$S$_5$ | 1341.9 |
| Comp. Example 2 |  | 67 |  | 1011.0 |
| Example 1 |  | 104 |  | 899.4 |
| Example 2 |  | 140 |  | 870.2 |
| Example 3 |  | 176 |  | 850.1 |

As clearly seen by the results in Table 1 and FIG. 4, heat generation of the positive electrode material at high temperature was markedly lower when the average covering thickness of the first solid electrolyte on the surface of the positive electrode active material was 104 nm or greater. This suggests that the presence of the first solid electrolyte having at least the specified thickness made it more difficult for oxygen released from the positive electrode active material to reach the second solid electrolyte, thus helping to impede exothermic reaction.

2. Resistance Evaluation

2.1 Comparative Examples 1 and 2 and Examples 1 to 3

Batteries were fabricated in the same manner as described above and the DCIR battery resistance (SOC: 73%, 7 C. 10-second resistance) was measured.

2.2 Comparative Example 3

A positive electrode active material not covered by the first solid electrolyte, VGCF (Showa Denko K.K.) at 1.5 wt % of the active material, the first solid electrolyte, and the second solid electrolyte, were simultaneously mixed with an agate mortar to produce a positive electrode material. The content ratio of the active material, VGCF, first solid electrolyte and second solid electrolyte was the same as the content ratio for the positive electrode material of Example 1. A battery was fabricated in the same manner as Example 1 using this positive electrode material, and the DCIR battery resistance was evaluated.

2.3 Evaluation Results

Figure 5:
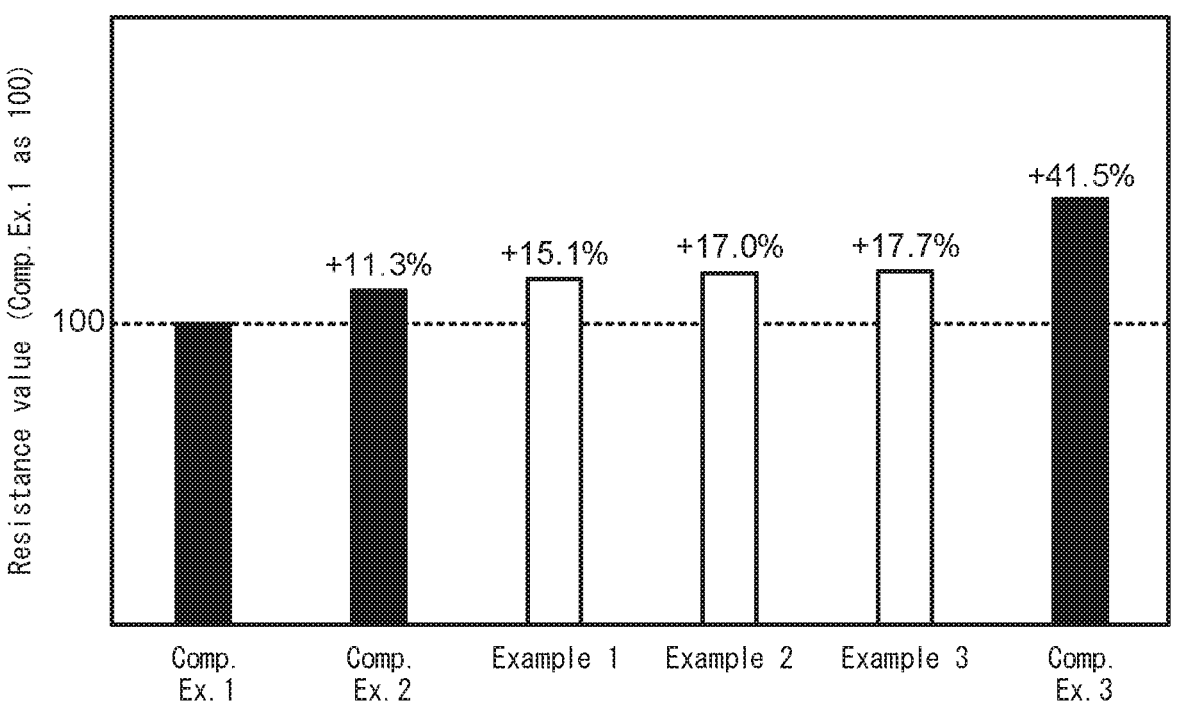
FIG. 5 is a graph comparatively showing the resistance values of the batteries of the Examples and Comparative Examples.

The resistance measurement results are shown in FIG. 5. The values in FIG. 5 are indexed with the resistance value of the battery of Comparative Example 1 as 100.

As clearly seen from the results in FIG. 5, the batteries of Examples 1 to 3, while having increased resistance compared to the battery of Comparative Example 1, had inhibited increase. This demonstrates that when the surface of the positive electrode active material is covered with the first solid electrolyte and the second solid electrolyte is connected with the first solid electrolyte, sufficient lithium ion conduction paths are formed between the positive electrode active material, first solid electrolyte and second solid electrolyte, so that the resistance is not significantly increased even if the thickness of the covering layer is as thick as 104 nm or greater. As also shown by the results of Comparative Example 3, however, battery resistance markedly increased when the first solid electrolyte was mixed and dispersed in the positive electrode material without the positive electrode active material covering the first solid electrolyte.

INDUSTRIAL APPLICABILITY

The battery of the present disclosure can be used for a wide range of purposes, from small power supplies for portable devices to large power supplies for automobiles and the like.

REFERENCE SIGNS LIST

10 Positive electrode material
10*a* Positive electrode active material
10*b* First solid electrolyte
10*c* Second solid electrolyte
100 Positive electrode active material layer
200 Solid electrolyte layer
300 Negative electrode active material layer
400 Positive electrode collector
500 Negative electrode collector
1000 Battery

The invention claimed is:
1. A positive electrode material comprising:
a positive electrode active material particle comprising a lithium-containing oxide;
a covering layer disposed on at least part of a surface of the positive electrode active material particle, wherein the covering layer comprises a first solid electrolyte material and a conductive aid, and wherein the average covering thickness of the covering layer is 104 nm or greater and 300 nm or lower; and a second solid electrolyte material that contacts the covering layer, wherein:

the first solid electrolyte material has a chemical composition represented by $Li_aM_bX_g$, where:

a, b and g each independently represent a value greater than 0,

M is yttrium, and

X is selected from the group consisting of Cl, Br, and a combination thereof, and the second solid electrolyte material comprises Li, P, and S as constituent elements.

2. The positive electrode material according to claim 1, wherein the conductive aid is selected from the group consisting of vapor-grown carbon fibers (VGCF), carbon nanotubes (CNT), and carbon nanofibers (CNF).

3. A battery comprising:

a positive electrode active material layer, a solid electrolyte layer, and a negative electrode active material layer, wherein the positive electrode active material layer is composed of a positive electrode material according to claim 1.

\* \* \* \* \*